US012727009B2

(12) United States Patent
Zhou et al.

(10) Patent No.: US 12,727,009 B2
(45) Date of Patent: Sep. 1, 2026

(54) DATA TRANSMISSION METHOD AND APPARATUS, BASE STATION, AND TERMINAL

(71) Applicant: DATANG MOBILE COMMUNICATIONS EQUIPMENT CO., LTD., Beijing (CN)

(72) Inventors: Rui Zhou, Beijing (CN); Jing Liang, Beijing (CN); Ye Zhou, Beijing (CN); Li Chen, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 295 days.

(21) Appl. No.: 18/579,696

(22) PCT Filed: Jun. 16, 2022

(86) PCT No.: PCT/CN2022/099175
§ 371 (c)(1),
(2) Date: Jan. 16, 2024

(87) PCT Pub. No.: WO2023/000876
PCT Pub. Date: Jan. 26, 2023

(65) Prior Publication Data

US 2024/0306167 A1 Sep. 12, 2024

(30) Foreign Application Priority Data

Jul. 19, 2021 (CN) ......................... 202110813033.8

(51) Int. Cl.
*H04W 72/30* (2023.01)
*H04W 4/06* (2009.01)

(52) U.S. Cl.
CPC ............ *H04W 72/30* (2023.01); *H04W 4/06* (2013.01)

(58) Field of Classification Search
CPC ....... H04W 72/30; H04W 4/06; H04W 12/10; H04W 80/02; H04W 92/10
See application file for complete search history.

(56) References Cited

U.S. PATENT DOCUMENTS

2020/0229047 A1 7/2020 Kimba Dit Adamou et al.

FOREIGN PATENT DOCUMENTS

CN 107623913 A 1/2018
CN 109151826 A 1/2019
CN 112740731 A 4/2021
(Continued)

OTHER PUBLICATIONS

Office Action issued May 30, 2025 in Chinese Application No. 202110813033.8.
(Continued)

*Primary Examiner* — Yaotang Wang
(74) *Attorney, Agent, or Firm* — Harness, Dickey & Pierce, P.L.C.

(57) ABSTRACT

Embodiments of this disclosure provide a data transmission method and apparatus, a base station, and a terminal. The method includes: determining, by a base station, that a terminal needs to receive a multicast broadcast service (MBS) service; and transmitting, by the base station, numbering information of a packet data convergence protocol (PDCP) data protocol data unit (PDU) of the MBS service to the terminal.

18 Claims, 5 Drawing Sheets

(56) References Cited

FOREIGN PATENT DOCUMENTS

| | | | | | |
|---|---|---|---|---|---|
| CN | 112996052 | A | | 6/2021 | |
| WO | WO-2022206983 | A1 | * | 10/2022 | ............. H04L 47/34 |

OTHER PUBLICATIONS

Extended European Search report issued Mar. 21, 2024 in European Application No. 22845042.5.

Xiaomi Communications, "MBS impacts on PDCP," 3GPP TSG-RAN WG2 meeting #114, R2-2105727, May 11, 2021.

International Search Report and Written Opinion issued Sep. 16, 2022 in International Application No. PCT/CN2022/099175.

"3rd Generation Partnership Project;Technical Specification Group Radio Access Network;Evolved Universal Terrestrial Radio Access (E-UTRA);Packet Data Convergence Protocol (PDCP) specification", 3GPP TS 36.323, Dec. 19, 2007.

Xiaomi Communications, "MBS impacts on PDCP," 3GPP TSG-RAN WG2 Meeting #113bis, R2-2104227, Apr. 2, 2021.

* cited by examiner

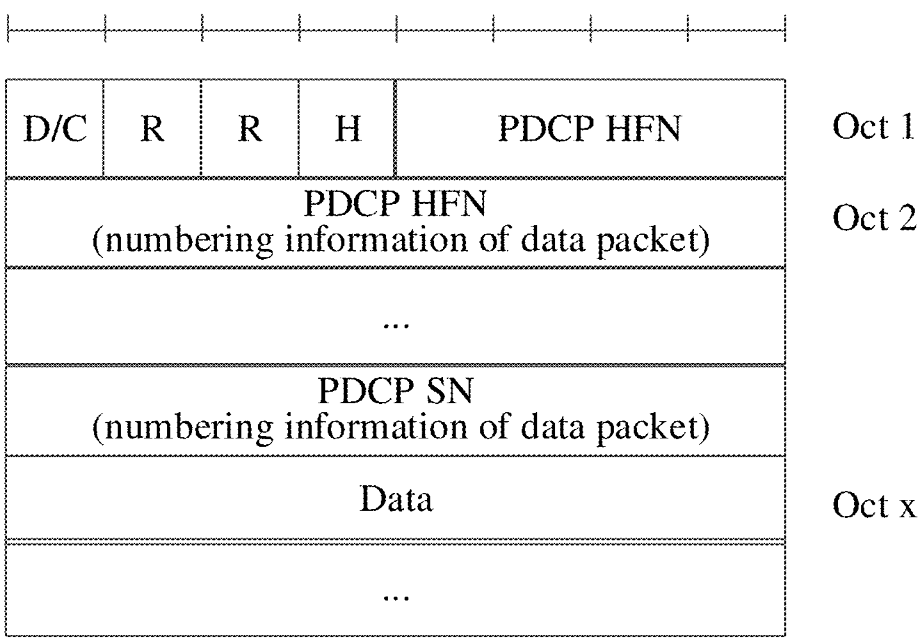
FIG. 3
| Bit | Description |
|---|---|
| 000 | PDCP status report |
| 001 | Interspersed ROHC feedback |
| 010 | EHC feedback |
| 011 | PDCP HFN |
| 011-111 | Reserved |
FIG. 4
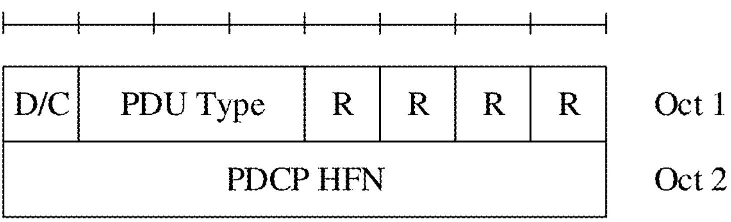
FIG. 5

| Bit | Description |
|---|---|
| 000 | PDCP status report |
| 001 | Interspersed ROHC feedback |
| 010 | EHC feedback |
| 011 | PDCP COUNT |
| 011-111 | Reserved |
FIG. 6
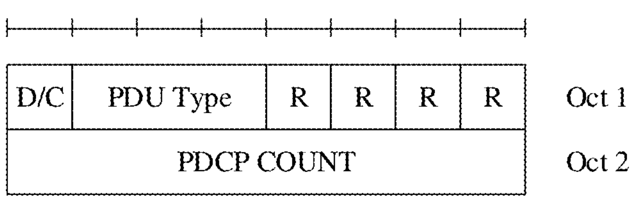
FIG. 7
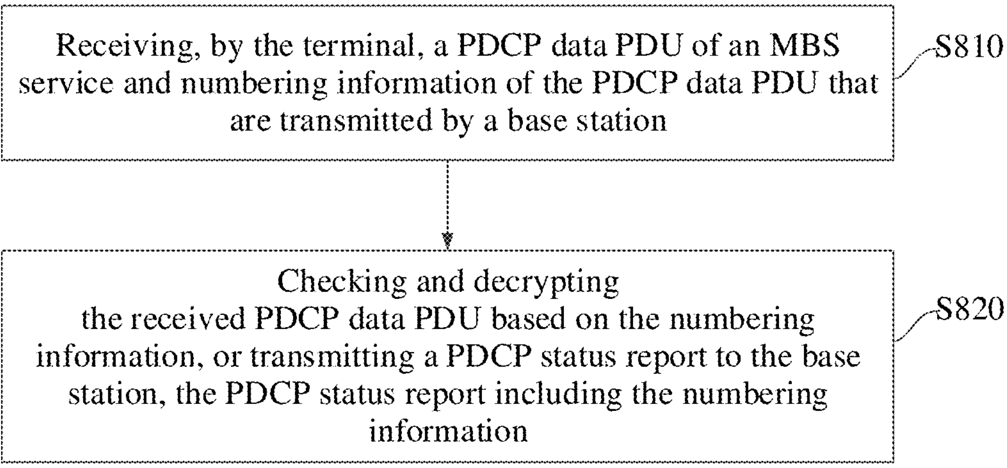
FIG. 8

DATA TRANSMISSION METHOD AND APPARATUS, BASE STATION, AND TERMINAL

CROSS-REFERENCE TO RELATED APPLICATIONS

The present application is a U.S. national phase application of a PCT Application No. PCT/CN2022/099175 filed on Jun. 16, 2022, which claims priority to the Chinese patent application No. 202110813033.8 filed in China on Jul. 19, 2021, the disclosures of each of which are incorporated herein by reference in their entireties.

TECHNICAL FIELD

The present disclosure relates to the field of wireless technologies, and more particularly, to a data transmission method and apparatus, a base station, and a terminal.

BACKGROUND

In the New Radio (NR) technology, during transmission of a service data packet, a network-side packet data convergence protocol (PDCP) layer, when performing operations such as integrity protection and encryption on a PDCP data packet, uses a data packet number corresponding to the PDCP data packet, i.e., a COUNT value; after receiving a PDCP data protocol data unit (PDU), a terminal (user equipment, UE) also uses the COUNT value corresponding to the PDCP data PDU when performing corresponding operations of integrity checking and decryption.

For multicast broadcast service (MBS) data transmission, all UEs receive a same PDCP data PDU on a same MBS radio bearer (MRB) according to the related art. Therefore, when a specific UE starts receiving an MRB corresponding to a certain MBS service, MBS data may have already been communicated on the MRB for some time, i.e., the COUNT value of the PDCP data PDU has increased to a specific value, in other words, a COUNT value corresponding to a first PDCP data PDU received by the UE is not 0. Therefore, there is a problem that the terminal is unable to obtain the COUNT value corresponding to the currently received PDCP data packet, which in turn affects integrity checking and decryption, as well as a normal operation of a PDCP status report function, thereby affecting normal transmission of MBS data.

SUMMARY

Embodiments of the present disclosure provide a data transmission method and apparatus, a base station, and a terminal, and are directed to solving a problem in the related art that, during a transmission of MBS data, the terminal is unable to obtain a COUNT value corresponding to a currently received PDCP data packet, which in turn affects integrity checking and decryption, as well as the normal transmission of the MBS data.

An embodiment of the present disclosure provides a data transmission method. The method is performed by a base station. The method includes: determining, by the base station, that a terminal needs to receive a multicast broadcast service (MBS) service; and transmitting numbering information of a packet data convergence protocol (PDCP) data protocol data unit (PDU) of the MBS service to the terminal.

In an embodiment according to the present disclosure, the transmitting the numbering information of the PDCP data PDU of the MBS service to the terminal includes: transmitting the numbering information of the PDCP data PDU of the MBS service to the terminal through a message header of the PDCP data PDU.

In an embodiment according to the present disclosure, the message header of the PDCP data PDU further includes a predetermined indication bit for indicating whether the message header includes data packet numbering information.

In an embodiment according to the present disclosure, the transmitting the numbering information of the PDCP data PDU of the MBS service to the terminal includes: transmitting the numbering information of the PDCP data PDU of the MBS service to the terminal through a packet data convergence protocol (PDCP) control protocol data unit (PDU).

In an embodiment according to the present disclosure, the PDCP control PDU includes PDU type information; and the PDU type information indicates that the PDCP control PDU is used for transmitting the numbering information of the PDCP data PDU.

In an embodiment according to the present disclosure, the transmitting the numbering information of the PDCP data PDU of the MBS service to the terminal includes: transmitting, by the base station, a radio resource control (RRC) message. The RRC message carries the numbering information of the PDCP data PDU of the MBS service.

In an embodiment according to the present disclosure, the transmitting the numbering information of the PDCP data PDU of the MBS service to the terminal includes: transmitting the numbering information of the PDCP data PDU of the MBS service to the terminal through a dedicated resource or a shared resource.

In an embodiment according to the present disclosure, the transmitting the numbering information of the PDCP data PDU of the MBS service to the terminal includes: determining, by the base station, whether a predetermined trigger condition is satisfied; and transmitting the numbering information of the PDCP data PDU of the MBS service to the terminal in case that the predetermined trigger condition is satisfied.

In an embodiment according to the present disclosure, the predetermined trigger condition includes at least one of: a predetermined trigger period; resetting of PDCP sequence number occurring in two adjacent PDCP data PDU transmissions; or subsequent to transmitting the PDCP data PDU of the MBS service for the first time, monitoring that the terminal is a terminal that receives the PDCP data PDU for the first time.

In an embodiment according to the present disclosure, the numbering information includes a numbering COUNT value of the PDCP data PDU, a hyper frame number (HFN) of the PDCP data PDU, or both the numbering COUNT value of the PDCP data PDU and the HFN of the PDCP data PDU.

An embodiment of the present disclosure further provides a data transmission method, which is performed by a terminal. The method includes: receiving, by the terminal, a packet data convergence protocol (PDCP) data protocol data unit (PDU) of a multicast broadcast service (MBS) service and numbering information of the PDCP data PDU that are transmitted by a base station; and checking and decrypting the received PDCP data PDU based on the numbering information, or transmitting a PDCP status report to the base station. The PDCP status report includes the numbering information.

In an embodiment according to the present disclosure, the receiving, by the terminal, the numbering information of the PDCP data PDU transmitted by the base station includes: receiving the numbering information of the PDCP data PDU transmitted by the base station through a message header of the PDCP data PDU.

In an embodiment according to the present disclosure, the message header of the PDCP data PDU further includes a predetermined indication bit for indicating whether the message header includes data packet numbering information.

In an embodiment according to the present disclosure, the receiving, by the terminal, the numbering information of the PDCP data PDU transmitted by the base station includes: receiving the numbering information of the PDCP data PDU transmitted by the base station through a PDCP control PDU.

In an embodiment according to the present disclosure, the PDCP control PDU includes PDU type information; and the PDU type information indicates that the PDCP control PDU is used for transmitting the numbering information of the PDCP data PDU.

In an embodiment according to the present disclosure, the receiving, by the terminal, the numbering information of the PDCP data PDU transmitted by the base station includes: receiving a radio resource control (RRC) message transmitted by the base station. The RRC message carries the numbering information of the PDCP data PDU of the MBS service.

In an embodiment according to the present disclosure, the receiving, by the terminal, the numbering information of the PDCP data PDU transmitted by the base station includes: receiving, by the terminal, the numbering information of the PDCP data PDU transmitted by the based station through a dedicated resource or a shared resource.

An embodiment of the present disclosure further provides a base station. The base station includes a memory, a transceiver, and a processor. The memory is configured to store a computer program. The transceiver is for transmitting and receiving data under control of the processor. The processor is configured to read the computer program in the memory to perform: determining that a terminal needs to receive a multicast broadcast service (MBS) service; and transmitting numbering information of a PDCP data PDU of the MBS service to the terminal.

In an embodiment according to the present disclosure, the transmitting the numbering information of the PDCP data PDU of the MBS service to the terminal includes: transmitting the numbering information of the PDCP data PDU of the MBS service to the terminal through a message header of the PDCP data PDU.

In an embodiment according to the present disclosure, the message header of the PDCP data PDU further includes a predetermined indication bit for indicating whether the message header includes data packet numbering information.

In an embodiment according to the present disclosure, the transmitting the numbering information of the PDCP data PDU of the MBS service to the terminal includes: transmitting the numbering information of the PDCP data PDU of the MBS service to the terminal through a PDCP control PDU.

In an embodiment according to the present disclosure, the PDCP control PDU includes PDU type information; and the PDU type information indicates that the PDCP control PDU is used for transmitting the numbering information of the PDCP data PDU.

In an embodiment according to the present disclosure, the transmitting the numbering information of the PDCP data PDU of the MBS service to the terminal includes: transmitting a radio resource control (RRC) message. The RRC message carries the numbering information of the PDCP data PDU of the MBS service.

In an embodiment according to the present disclosure, the transmitting the numbering information of the PDCP data PDU of the MBS service to the terminal includes: transmitting the numbering information of the PDCP data PDU of the MBS service to the terminal through a dedicated resource or a shared resource.

In an embodiment according to the present disclosure, the transmitting the numbering information of the PDCP data PDU of the MBS service to the terminal includes: determining whether a predetermined trigger condition is satisfied; and transmitting the numbering information of the PDCP data PDU of the MBS service to the terminal in case that the predetermined trigger condition is satisfied.

In an embodiment according to the present disclosure, the predetermined trigger condition includes at least one of: a predetermined trigger period; resetting of PDCP sequence number occurring in two adjacent PDCP data PDU transmissions; or subsequent to transmitting the PDCP data PDU of the MBS service for the first time, monitoring that the terminal is a terminal that receives the PDCP data PDU for the first time.

In an embodiment according to the present disclosure, the numbering information includes a numbering COUNT value of the PDCP data PDU, a hyper frame number (HFN) of the PDCP data PDU, or both the numbering COUNT value of the PDCP data PDU and the HFN of the PDCP data PDU.

An embodiment of the present disclosure further provides a terminal. The terminal includes a memory, a transceiver, and a processor. The memory is configured to store a computer program. The transceiver is for transmitting and receiving data under control of the processor. The processor is configured to read the computer program in the memory to perform: receiving a PDCP data PDU of an MBS service and numbering information of the PDCP data PDU that are transmitted by a base station; and checking and decrypting the received PDCP data PDU based on the numbering information, or transmitting a PDCP status report to the base station. The PDCP status report includes the numbering information.

In an embodiment according to the present disclosure, the receiving the numbering information of the PDCP data PDU transmitted by the base station includes: receiving the numbering information of the PDCP data PDU transmitted by the base station through a message header of the PDCP data PDU.

In an embodiment according to the present disclosure, the message header of the PDCP data PDU further includes a predetermined indication bit for indicating whether the message header includes data packet numbering information.

In an embodiment according to the present disclosure, the receiving the numbering information of the PDCP data PDU transmitted by the base station includes: receiving the numbering information of the PDCP data PDU transmitted by the base station through a PDCP control PDU.

In an embodiment according to the present disclosure, the PDCP control PDU includes PDU type information; and the PDU type information indicates that the PDCP control PDU is used for transmitting the numbering information of the PDCP data PDU.

In an embodiment according to the present disclosure, the receiving the numbering information of the PDCP data PDU transmitted by the base station includes: receiving a radio resource control (RRC) message transmitted by the base station. The RRC message carries the numbering information of the PDCP data PDU of the MBS service.

In an embodiment according to the present disclosure, the receiving the numbering information of the PDCP data PDU transmitted by the base station includes: receiving the numbering information of the PDCP data PDU transmitted by the base station through a dedicated resource or a shared resource.

An embodiment of the present disclosure further provides a data transmission apparatus, which is applied in a base station. The apparatus includes: a determination unit configured to determine that a terminal needs to receive a multicast broadcast service (MBS) service; and a transmitting unit configured to transmit numbering information of a PDCP data PDU of the MBS service to the terminal.

An embodiment of the present disclosure further provides a data transmission apparatus, which is applied in a terminal. The apparatus includes: a receiving unit configured to receive a PDCP data PDU of a multicast broadcast service (MBS) service and numbering information of the PDCP data PDU that are transmitted by a base station; and a processing unit configured to check and decrypt the received PDCP data PDU based on the numbering information, or transmit a PDCP status report to the base station. The PDCP status report includes the numbering information.

An embodiment of the present disclosure further provides a processor-readable storage medium. The processor-readable storage medium has a computer program stored thereon. The computer program is configured to cause a processor to perform any one of the aforementioned data transmission methods.

At least one of the above technical solutions of specific embodiments of the present disclosure has the following beneficial effects.

According to the data transmission method provided by the embodiments of the present disclosure, the numbering information of the PDCP data PDU is transmitted to the terminal, such that the terminal obtains the COUNT value and/or the HFN of the received PDCP data PDU and records the corresponding numbering information. In this way, it can be ensured that, when the integrity checking and decryption are performed or the PDCP status report is transmitted, the COUNT value and/or the HFN used on the terminal side is consistent with the COUNT value and/or the HFN used on the base station side, and the problem of affecting the data transmission can be avoided.

BRIEF DESCRIPTION OF THE DRAWINGS

In order to explain technical solutions of embodiments of the present disclosure or in the related art more clearly, accompanying drawings required for the description of the embodiments or the related art are briefly described below. Obviously, the accompanying drawings as described below are merely some embodiments set forth in the present disclosure. Based on these drawings, other accompanying drawings may be obtained by those of ordinary skill in the art without creative effort.

FIG. 3 shows a schematic structural diagram of a PDCP data PDU for transmitting data packet numbering information in a method according to an embodiment of the present disclosure;

FIG. 4 shows one of type information of a PDCP control PDU in a method according to an embodiment of the present disclosure;

FIG. 5 shows one of implementation structures of a PDCP control PDU for transmitting data packet numbering information in a method according to an embodiment of the present disclosure;

FIG. 6 shows another one of type information of a PDCP control PDU in a method according to an embodiment of the present disclosure;

FIG. 7 shows another one of implementation structures of a PDCP control PDU for transmitting data packet numbering information in a method according to an embodiment of the present disclosure;

FIG. 8 shows a schematic flowchart of a data transmission method according to another embodiment of the present disclosure;

DETAILED DESCRIPTION

Figure 1:
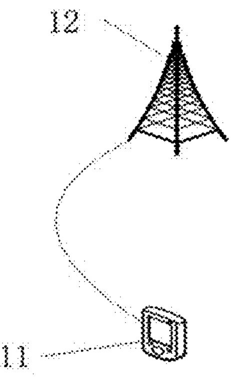
FIG. 1 shows a structural diagram of a network system to which embodiments of the present disclosure are applicable.

Technical solutions according to embodiments of the present disclosure will be clearly and thoroughly described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative effort shall fall within the scope of the present disclosure.

Terms such as "first" and "second" in the specification and claims of the present disclosure are used to distinguish similar objects, rather than describing a specific sequence or order. It should be understood that data used in this way can be interchanged with each other under appropriate circumstances. For example, the described embodiments of the present disclosure can be implemented in a sequence other than those illustrated in the figures or described in the present disclosure. Terms "including", "having", and any variations thereof are intended to cover non-exclusive inclusions. For example, a process, method, system, product, or device that includes a series of steps or units is not necessarily limited to those clearly listed steps or units, but may also include other steps or units that are not clearly listed or are inherent in the process, method, product, or device.

In the embodiments of the present disclosure, the term "and/or" describes an association relationship of associated objects and expresses that three kinds of relationships may exist. For example, A and/or B may indicate three cases: A exists alone, both A and B exist, and B exists alone. The character "/" generally represents an "or" relationship between the correlated objects preceding and following the symbol. In the embodiments of the present disclosure, the term "plurality" refers to two or more, and other quantifiers are similar thereto.

In the embodiments of the present disclosure, words like "exemplary" or "for example" are used for representing an example, an illustration, or a description. Any embodiment or design scheme described as "exemplary" or "for example" in the embodiments of the present disclosure should not be construed as being more preferred or more advantageous than other embodiments or design schemes; or rather, the use of words like "exemplary" or "for example" is intended to present related concepts concretely.

The embodiments of the present disclosure are described below with reference to the accompanying drawings. A data transmission method, a terminal device, and a network device provided in the embodiments of the present disclosure may be applied in a wireless communication system. The wireless communication system may be a system using a 5th generation (5G) mobile communication technology (hereinafter referred to as a 5G system for short). A person skilled in the art may understand that a 5G NR system is merely an example but not a limitation.

Referring to FIG. 1, FIG. 1 is a structural diagram of a network system to which embodiments of the present disclosure are applicable. As illustrated in FIG. 1, the network system includes a terminal 11 and a base station 12. The terminal 11 may be a user equipment (UE). For example, the terminal 11 may be a terminal side device, such as a mobile phone, a tablet personal computer, a laptop computer, a personal digital assistant (PDA), a mobile Internet device (MID), or a wearable device. It should be noted that a specific type of the user terminal 11 is not limited in the embodiments of the present disclosure. The base station 12 may be a base station in a fifth-generation mobile communication (5G) technology and subsequent versions of mobile communication technology (e.g., a 5G base station (gNB), a 5G NR NB), or base stations in other communication systems, or referred to as a node B. It should be noted that in the embodiments of the present disclosure, only a 5G base station is used as an example, but a specific type of the base station 12 is not limited.

At present, for data transmission over an air interface, taking the 5G/NR technology in the related art as an example, before an initiation of service transmission, the base station informs user terminals of the mapping and configuration of service data through radio resource control (RRC) signaling.

After the configuration is completed, downlink data arrives at a radio access network (RAN) in the form of a data packet of a quality of service flow (QoS flow). A service data adaptation protocol (SDAP) layer in the RAN treats the data packet as an SDAP service data unit (SDU), maps the data packet to a correct downlink radio bearer as an SDAP PDU, and transmits the SDAP PDU to a PDCP in the RAN through an internal interface associated with the downlink radio bearer.

After receiving the SDAP PDU, the PDCP layer treats it as a PDCP SDU and performs processing on it. Specifically, the following processings should be performed successively. After receiving data packets from an upper layer, the PDCP layer will number each data packet (with a COUNT value) before transmission. The first several bits of the data packet number are referred to as a hyper frame number (HFN), and the last several bits of the data packet number are referred to as a PDCP sequence number (SN). Then, header compression and security operations such as integrity protection and encryption are performed as configured, to form a PDCP header and generate a PDCP PDU. The PDCP SN is carried in the PDCP header, and then the PDCP PDU is transmitted to a radio link control (RLC) protocol layer.

For MBS data transmission, all UEs receive a same PDCP data PDU on a same MRB according to the related art. Therefore, when a specific UE starts receiving an MRB corresponding to a certain MBS service, MBS data may have already been transmitted on the MRB for some time, i.e., the COUNT value of the PDCP data PDU has increased to a specific numerical value. Therefore, a COUNT value corresponding to a first PDCP data PDU received by a UE is not 0, and an HFN value in the corresponding COUNT value may also not be 0. If a unicast mechanism were still used and the HFN corresponding to the first received PDCP data PDU were considered to start from 0, a correspondence between the received PDCP data PDU and the COUNT value on the UE side would be different from a correspondence between the PDCP data PDU and the COUNT value on the base station side.

However, when performing operations such as integrity protection and encryption on the PDCP data packet, the PDCP layer on the base station side uses the COUNT value corresponding to the PDCP data packet. After receiving the PDCP data PDU, the UE side also uses the COUNT value corresponding to the PDCP data PDU when performing corresponding operations of integrity checking and decryption. For a specific PDCP data PDU, if the COUNT value used on the UE side is different from the COUNT value used on a network side, the integrity checking and decryption will fail, thereby affecting normal reception of the data.

In addition, the PDCP layer on the UE side transmits a PDCP status report to the network side at a specific time. The PDCP status report carries a COUNT value of a PDCP data PDU that is not received in a receiving window. For the specific PDCP data PDU, if the COUNT value used on the UE side is different from the COUNT value used on the network side, the network side will transmit a wrong PDCP data PDU based on a wrong COUNT value, which also cause a problem of affecting normal reception of data.

In order to solve a problem that, during a transmission of MBS data, the terminal is unable to obtain a COUNT value corresponding to a currently received PDCP data packet, which in turn affects integrity checking and decryption, as well as the normal transmission of the MBS data, an embodiment of the present disclosure provides a data transmission method, in which when the PDCP data PDU is transmitted, the data packet numbering information of the PDCP data PDU is transmitted to the terminal, so that the normal operation of functions related to the data packet number of the PDCP layer on the UE side, such as integrity checking and decryption, and a function of the PDCP status report can be ensured.

Figure 2:
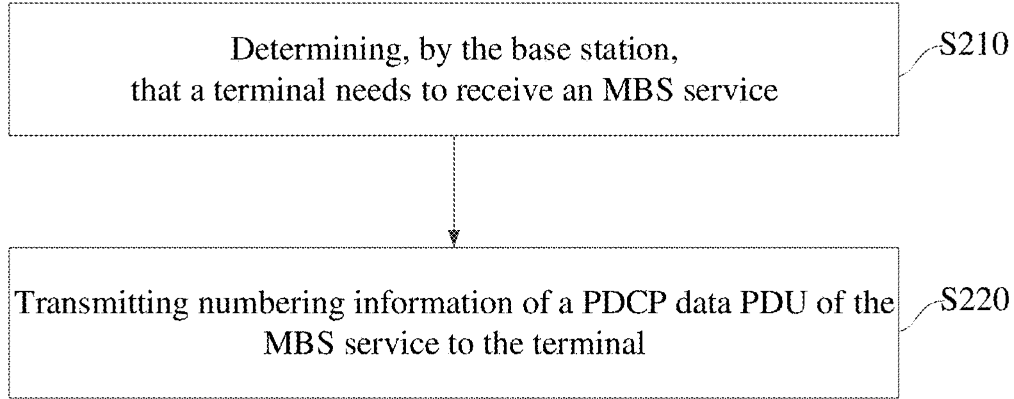
FIG. 2 shows a schematic flowchart of a data transmission method according to an embodiment of the present disclosure.

The data transmission method according to an embodiment of the present disclosure is performed by a base station. As illustrated in FIG. 2, the method includes the following steps S210 and S220.

At step S210, the base station determines that a terminal needs to receive an MBS service.

It should be noted that the base station determines the MBS service which the terminal needs to receive. Here, the MBS service which the terminal needs to receive may be understood as a first MBS service, which includes an MBS service that the terminal is interest in, an MBS service that is being received by the terminal, and the like. The term "first" used here is not specific, but refers to a certain MBS service in general.

At step S220, the base station transmits numbering information of a PDCP data PDU of the MBS service to the terminal.

In the implementation, the numbering information of the PDCP data PDU is transmitted to the terminal, and the terminal records the corresponding numbering information. In this way, it can be ensured that, when the integrity checking and decryption are performed or the PDCP status report is transmitted, the COUNT value and/or the HFN used on the terminal side is consistent with the COUNT value and/or the HFN used on the base station side, and the problem of affecting the data transmission can be avoided.

In an embodiment according to the present disclosure, the numbering information includes at least one or more of a numbering COUNT value and an HFN of the PDCP data PDU.

The numbering COUNT value is a value of data serial number obtained after the PDCP layer of the base station numbers each data packet when transmitting the PDCP data PDU. The HFN is a serial number value in the predetermined quantity of most significant bits of the COUNT value. In an embodiment according to the present disclosure, the numbering COUNT value of the PDCP data PDU is equal to a sum of the HFN and the PDCP sequence number.

At step S220, a target service is the MBS service. The data transmission method according to the embodiments of the present disclosure can particularly solve a problem that the COUNT value and/or the HFN used on the terminal side is inconsistent with the COUNT value and/or the HFN used on the base station side during the MBS service.

In an embodiment according to the present disclosure, at step S220, the transmitting the numbering information of the PDCP data PDU of the MBS service to the terminal includes: determining, by the base station, whether a predetermined trigger condition is satisfied; and transmitting the numbering information of the PDCP data PDU of the MBS service to the terminal in case that the predetermined trigger condition is satisfied.

In an embodiment according to the present disclosure, the predetermined trigger condition includes at least one of: a predetermined trigger period; resetting of PDCP sequence number occurring in two adjacent PDCP data PDU transmissions; or subsequent to transmitting the PDCP data PDU of the MBS service for the first time, monitoring that the terminal is a terminal that receives the PDCP data PDU for the first time.

By using the data transmission method according to this embodiment, the numbering information of the PDCP data PDU is transmitted to the terminal only in case that the at least one of the above predetermined trigger conditions is satisfied, so as to avoid a problem of excessive resource occupation by the transmission of the numbering information.

Based on the above predetermined triggering conditions, in an implementation of an embodiment according to the present disclosure, when the predetermined trigger period is reached, the numbering information of the PDCP data PDU of the MBS service is transmitted to the terminal. In an embodiment according to the present disclosure, when the PDCP data PDU of the MBS service is transmitted, the numbering information of the PDCP data PDU may be transmitted to the terminal every time interval of a preset length based on the predetermined trigger period.

In another implementation of the embodiment of the present disclosure, because the PDCP sequence number in the COUNT value, which is numbered each time a PDCP data PDU is transmitted, will be reset and start from 0 again when the PDCP sequence number increases to a predetermined value, during the transmission of the PDCP data PDU of the MBS service, when a resetting of PDCP sequence number occurs in two adjacent PDCP data PDU transmissions, i.e., when a PDCP sequence number of a currently transmitted PDCP data PDU is reset compared to a PDCP sequence number of a previously transmitted PDCP data PDU, the numbering information of the PDCP data PDU is transmitted to the terminal, such that the terminal can record the COUNT value and/or the HFN in a case of PDCP sequence number resetting.

In yet another implementation of the embodiment according to the present disclosure, if after the PDCP data PDU of the MBS service is transmitted for the first time, it is monitored that the terminal is a terminal that receives the PDCP data PDU for the first time, i.e., if a terminal receiving the PDCP data PDU for the first time is detected after the PDCP data PDU of the MBS service is transmitted for the first time, the numbering information of the PDCP data PDU is transmitted to the terminal. According to this implementation, subsequent to the transmission of the PDCP data PDU of the MBS service for the first time, if it is monitored that a terminal just starts to receive the PDCP data PDU for the first time, in other words, there should be a situation where the terminal does not receive the previously transmitted PDCP data PDUs, then the numbering information of the PDCP data PDU is transmitted to the terminal, to enable the terminal to obtain the COUNT value and/or the HFN of the received PDCP data PDU and to record the corresponding numbering information, so as to facilitate the integrity checking and decryption.

In the embodiment of the present disclosure, at step S220, the transmitting the numbering information of the PDCP data PDU of the MBS service to the terminal includes at least one of following operations: transmitting the numbering information of the PDCP data PDU of the MBS service to the terminal through a message header of the PDCP data PDU; transmitting the numbering information of the PDCP data PDU of the MBS service to the terminal through a PDCP control PDU; transmitting, by the base station, a radio resource control (RRC) message, the RRC message carrying the numbering information of the PDCP data PDU of the MBS service.

In an embodiment according to the present disclosure, in case that the numbering information of the PDCP data PDU of the MBS service is transmitted to the terminal through the message header of the PDCP data PDU, the message header of the PDCP data PDU further includes a predetermined indication bit for indicating whether the message header includes data packet numbering information.

In an embodiment according to the present disclosure, the predetermined indication bit being a first value indicates that the message header includes the numbering information of the data packet; and the predetermined indication bit being a second value indicates that the message header does not include the numbering information of the data packet.

In an implementation, a structure of the PDCP message header is as shown in FIG. 3, and the last reserved bit in the PDCP message header is the predetermined indication bit, e.g., the predetermined indication bit is labeled as H, which is used for indicating whether the PDCP message header includes the data packet numbering information (cont.).

In an embodiment according to the present disclosure, the predetermined indication bit H indicates, through one bit, whether the PDCP message header includes the numbering information. For example, the predetermined indication bit H being 0 indicates that the PDCP message header does not include the numbering information; and the predetermined indication bit H being 1 indicates that the PDCP message header includes the numbering information.

In an embodiment according to the present disclosure, since the PDCP data PDU includes the PDCP sequence number, the numbering information in the PDCP message header is the HFN in this implementation, and the COUNT value during the transmission of the PDCP data PDU can be obtained based on the HFN in the PDCP message header and the PDCP data PDU.

In another implementation, the numbering information of the PDCP data PDU of the MBS service is transmitted to the terminal through the PDCP control PDU. According to an embodiment of the present disclosure, in an implementation, the PDCP control PDU includes PDU type information. The PDU type information indicates that the PDCP control PDU is used for indicating the data packet numbering information.

By using this implementation, on the basis of the types of control information that can be carried in the PDCP control PDU in the related art, a type of control information for transmitting the numbering information is defined to carry the HFN or COUNT value corresponding to the current PDCP data PDU.

For example, in an implementation, as illustrated in FIG. 4 and FIG. 5, the HFN corresponding to the current PDCP data PDU is transmitted to the terminal through the PDCP control PDU.

According to FIG. 4, the PDU type information is added, e.g., the PDU type information is represented as "011", to indicate that the PDCP control PDU is used for transmitting the HFN. In an embodiment according to the present disclosure, a specific implementation structure of a PDCP control PDU for transmitting an HFN corresponding to a current PDCP data PDU is as illustrated in FIG. 5.

In another implementation, as illustrated in FIG. 6 and FIG. 7, a COUNT value corresponding to a current PDCP data PDU is transmitted to the terminal through the PDCP control PDU.

According to FIG. 6, the PDU type information is added, e.g., the PDU type information is represented as "011", to indicate that the PDCP control PDU is used for transmitting the COUNT value. In an embodiment according to the present disclosure, a specific implementation structure of a PDCP control PDU for transmitting a COUNT value corresponding to a current PDCP data PDU is as illustrated in FIG. 7.

In another embodiment according to the present disclosure, the numbering information of the PDCP data PDU may also be transmitted to the terminal through the RRC message. In other words, the base station transmits an RRC message, and the RRC message carries the numbering information of the PDCP data PDU of the MBS service. For example, before the PDCP data PDU is transmitted, the numbering information of the to-be-transmitted PDCP data PDU is transmitted to the terminal through the RRC message. In another embodiment according to the present disclosure, the RRC message includes a predetermined field for indicating the numbering information.

According to the above implementations, the COUNT value and/or the HFN of the PDCP data PDU is transmitted to the UE, such that the UE can obtain the COUNT value corresponding to the current PDCP data PDU when starting receiving the MBS service.

In an embodiment according to the present disclosure, at step S220, when the numbering information of the PDCP data PDU of the MBS service is transmitted to the terminal, the numbering information of the PDCP data PDU may be transmitted to the terminal through a dedicated resource or a shared resource.

Specifically, transmitting the numbering information of the PDCP data PDU to the terminal through the dedicated resource means the numbering information of the PDCP data PDU is transmitted to the terminal in a unicast manner, in other words, the numbering information of the PDCP data PDU is only transmitted to a specific terminal in the unicast manner. The specific terminal is a terminal that is monitored to start receiving the PDCP data PDU for the first time subsequent to the transmission of the PDCP data PDU of the MBS service for the first time.

Transmitting the numbering information of the PDCP data PDU to the terminal through the shared resource means the numbering information of the PDCP data PDU is transmitted to terminals in a multicast manner. In this manner, the numbering information of the PDCP data PDU may be transmitted to a plurality of different terminals by using the shared resource in the multicast manner.

Based on the foregoing transmission manners of the numbering information, in an implementation, when the numbering information is transmitted to the terminal through the message header of the PDCP data PDU, the PDCP data PDU can be transmitted to the terminal through the dedicated resource or through the shared resource. In another implementation, when the numbering information is transmitted to the terminal through the PDCP control PDU, the PDCP control PDU can be transmitted to the terminal through the dedicated resource or through the shared resource.

Another embodiment of the present disclosure further provides a data transmission method, which is performed by a terminal. As illustrated in FIG. 8, the method includes the following steps S810 and S820.

At step S810, the terminal receives a PDCP data PDU of an MBS service and numbering information of the PDCP data PDU that are transmitted by a base station.

At step S820, the terminal checks and decrypts the received PDCP data PDU based on the numbering information, or transmits a PDCP status report to the base station. The PDCP status report includes the numbering information.

In an embodiment according to the present disclosure, the numbering information includes at least one or more of a numbering COUNT value of the PDCP data PDU and an HFN of the PDCP data PDU.

By using the data transmission method according to the embodiments of the present disclosure, the base station transmits the numbering information of the PDCP data PDU to the terminal to enable the terminal to obtain the numbering information of the received PDCP data PDU and record the corresponding numbering information. In this way, it can be ensured that, when the integrity checking and decryption are performed or the PDCP status report is transmitted, the COUNT value and/or the HFN used on the terminal side is consistent with the COUNT value and/or the HFN used on the base station side, and the problem of affecting the data transmission can be avoided.

In an embodiment according to the present disclosure, at step S810, the data transmission method according to the embodiment of the present disclosure can particularly solve the problem that the COUNT value and/or the HFN used on the terminal side is inconsistent with the COUNT value and/or the HFN used on the base station side during the MBS service.

In an embodiment according to the present disclosure, the method further includes: recording the corresponding numbering information based on the received PDCP data PDU.

In an embodiment according to the present disclosure, the receiving, by the terminal, the numbering information of the PDCP data PDU transmitted by the base station includes: receiving the numbering information of the PDCP data PDU transmitted by the base station through the message header of the PDCP data PDU.

In an embodiment according to the present disclosure, the message header of the PDCP data PDU further includes a predetermined indication bit for indicating whether the message header includes data packet numbering information.

In an embodiment according to the present disclosure, the predetermined indication bit being a first value indicates that the message header includes the numbering information of the data packet. The predetermined indication bit being a second value indicates that the message header does not include the numbering information of the data packet.

In an embodiment according to the present disclosure, the receiving, by the terminal, the numbering information of the PDCP data PDU transmitted by the base station includes: receiving the numbering information of the PDCP data PDU transmitted by the base station through a PDCP control PDU.

In an embodiment according to the present disclosure, the PDCP control PDU includes PDU type information; and the PDU type information indicates that the PDCP control PDU is used for transmitting the numbering information of the PDCP data PDU.

In an embodiment according to the present disclosure, the receiving, by the terminal, the numbering information of the PDCP data PDU transmitted by the base station includes: receiving a radio resource control (RRC) message transmitted by the base station. The RRC message carries the numbering information of the PDCP data PDU of the MBS service.

In an embodiment according to the present disclosure, the receiving, by the terminal, the numbering information of the PDCP data PDU transmitted by the base station includes: receiving, by the terminal, the numbering information of the PDCP data PDU transmitted by the base station through a dedicated resource or a shared resource. Accordingly, in the embodiments of the present disclosure, the receiving, by the terminal, the numbering information of the PDCP data PDU transmitted by the base station includes at least one of following operations: receiving the numbering information transmitted to the terminal by the base station through the message header of the PDCP data PDU; receiving the numbering information transmitted to the terminal by the base station through the PDCP control PDU; or receiving the RRC message transmitted by the base station, the RRC message carrying the numbering information of the PDCP data PDU of the MBS service.

Specifically, after the terminal notifies a core network that the terminal starts receiving the specific MBS service, the base station obtains the notification through the core network and starts transmitting the numbering information of the current PDCP data PDU to the terminal in one of the above manners over the air interface.

The terminal receiving the MBS service records the corresponding numbering information after the PDCP layer receives the numbering information corresponding to the current PDCP data PDU. In an embodiment according to the present disclosure, for the first received PDCP data PDU, numbering information corresponding to the PDCP data PDU is recorded. In an embodiment according to the present disclosure, for subsequently received PDCP data PDUs, the base station may transmit or not transmit corresponding numbering information to the terminal. For a PDCP data PDU that does not include the numbering information, the terminal may successively number each of subsequent PDCP data PDUs based on the first received PDCP data PDU, to obtain the corresponding COUNT value and/or HFN.

In addition, in an embodiment according to the present disclosure, the numbering information of the PDCP data PDU received by the terminal is transmitted in case that the predetermined trigger condition is satisfied.

In an embodiment according to the present disclosure, the predetermined trigger condition includes at least one of: a predetermined trigger period; resetting of PDCP sequence number occurring in two adjacent PDCP data PDU transmissions; or subsequent to transmitting the PDCP data PDU of the MBS service for the first time, monitoring that the terminal is a terminal that receives the PDCP data PDU for the first time.

Figure 9:
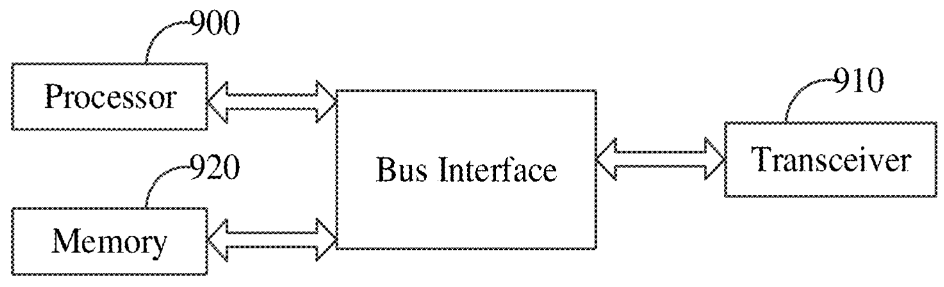
FIG. 9 shows a schematic structural diagram of a base station according to an embodiment of the present disclosure.

As illustrated in FIG. 9, an embodiment of the present disclosure further provides a base station. The base station includes a processor 900, a transceiver 910, a memory 920, and a program stored in the memory 920 and executable by the processor 900. The transceiver 910 is configured to receive and transmit data under control of the processor 900. The transceiver 910 is connected to the processor 900 and the memory 920 through a bus interface. The processor 900 is configured to read a program in the memory and implement: determining that a terminal needs to receive an MBS service; and transmitting numbering information of a PDCP data PDU of the MBS service to a terminal.

In an embodiment according to the present disclosure, the transmitting, by the processor 900, the numbering information of the PDCP data PDU of the MBS service to the terminal includes: transmitting the numbering information of the PDCP data PDU of the MBS service to the terminal through a message header of the PDCP data PDU.

In an embodiment according to the present disclosure, the message header of the PDCP data PDU further includes a predetermined indication bit for indicating whether the message header includes data packet numbering information.

In an embodiment according to the present disclosure, the transmitting, by the processor 900, the numbering information of the PDCP data PDU of the MBS service to the terminal includes: transmitting the numbering information of the PDCP data PDU of the MBS service to the terminal through a PDCP control PDU.

In an embodiment according to the present disclosure, the PDCP control PDU includes PDU type information; and the PDU type information indicates that the PDCP control PDU is used for transmitting the numbering information of the PDCP data PDU.

In an embodiment according to the present disclosure, the transmitting, by the processor 900, the numbering information of the PDCP data PDU of the MBS service to the terminal includes: transmitting a radio resource control (RRC) message. The RRC message carries the numbering information of the PDCP data PDU of the MBS service.

In an embodiment according to the present disclosure, the transmitting, by the processor 900, the numbering information of the PDCP data PDU of the MBS service to the terminal includes: transmitting the numbering information of the PDCP data PDU of the MBS service to the terminal through a dedicated resource or a shared resource.

In an embodiment according to the present disclosure, the transmitting, by the processor 900, the numbering information of the PDCP data PDU of the MBS service to the terminal includes: determining whether a predetermined trigger condition is satisfied; and transmitting the numbering information of the PDCP data PDU of the MBS service to the terminal in case that the predetermined trigger condition is satisfied.

In an embodiment according to the present disclosure, the predetermined trigger condition includes at least one of: a predetermined trigger period; resetting of PDCP sequence number occurring in two adjacent PDCP data PDU transmissions; or subsequent to transmitting the PDCP data PDU of the MBS service for the first time, monitoring that the terminal is a terminal that receives the PDCP data PDU for the first time.

In an embodiment according to the present disclosure, the numbering information includes a numbering COUNT value of the PDCP data PDU, a hyper frame number (HFN) of the PDCP data PDU, or both the numbering COUNT value of the PDCP data PDU and the HFN of the PDCP data PDU.

In FIG. 9, a bus architecture may include any quantity of interconnected buses and bridges, and connects various circuits including one or more processors represented by the processor 900 and a memory represented by the memory 920. The bus architecture may also connect various other circuits such as peripherals, voltage regulators and power management circuits, which is well known in the art. Therefore, a detailed description thereof is omitted herein. A bus interface provides an interface. The transceiver 910 may be multiple elements, i.e., a transmitter and a receiver, to allow for communication with various other apparatuses on the transmission media. These transmission media include wireless channel, wired channel, optic fiber or the like. The processor 900 is responsible for supervising the bus architecture and normal operations, and the memory 920 may store the data being used by the processor 900 during operations.

The processor 900 may be a central processing unit (CPU), an application specific integrated circuit (ASIC), a field-programmable gate array (FPGA) or a complex programmable logic device (CPLD). The processor may also adopt a multi-core architecture.

Figure 10:
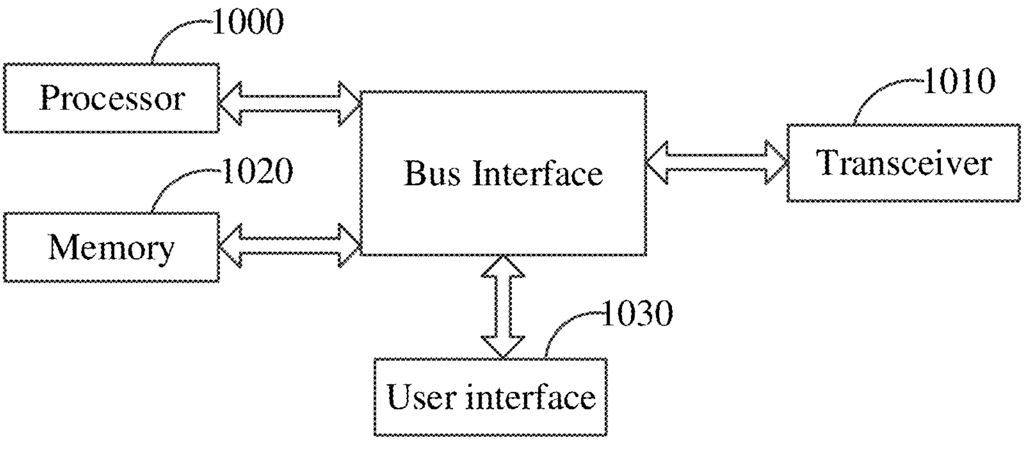
FIG. 10 shows a schematic structural diagram of a terminal according to an embodiment of the present disclosure.

As illustrated in FIG. 10, an embodiment of the present disclosure further provides a terminal. The terminal includes a processor 1000, a transceiver 1010, a memory 1020, and a program stored in the memory 1020 and executable by the processor 1000. The transceiver 1010 is connected to the processor 1000 and the memory 1020 through the bus interface. The transceiver 1010 is configured to receive and transmit data under the control of the processor 1000. The processor 1000 is configured to read the computer program in the memory to perform: receiving a PDCP data PDU of an MBS service and numbering information of the PDCP data PDU that are transmitted by a base station; and checking and decrypting the received PDCP data PDU based on the numbering information, or transmitting a PDCP status report to the base station. The PDCP status report includes the numbering information.

In an embodiment according to the present disclosure, the receiving, by the processor 1000, the numbering information of the PDCP data PDU transmitted by the base station includes: receiving the numbering information of the PDCP data PDU transmitted by the base station through a message header of the PDCP data PDU.

In an embodiment according to the present disclosure, the message header of the PDCP data PDU further includes a predetermined indication bit for indicating whether the message header includes data packet numbering information.

In an embodiment according to the present disclosure, the receiving, by the processor 1000, the numbering information of the PDCP data PDU transmitted by the base station includes: receiving the numbering information of the PDCP data PDU transmitted by the base station through a PDCP control PDU.

In an embodiment according to the present disclosure, the PDCP control PDU includes PDU type information; and the PDU type information indicates that the PDCP control PDU is used for transmitting the numbering information of the PDCP data PDU.

In an embodiment according to the present disclosure, the receiving, by the processor 1000, the numbering information of the PDCP data PDU transmitted by the base station includes: receiving a radio resource control (RRC) message transmitted by the base station. The RRC message carries the numbering information of the PDCP data PDU of the MBS service.

In an embodiment according to the present disclosure, the operation of receiving, by the processor 1000, the numbering information of the PDCP data PDU transmitted by the base station includes: receiving the numbering information of the PDCP data PDU transmitted by the base station through a dedicated resource or a shared resource.

In FIG. 10, a bus architecture may include any quantity of interconnected buses and bridges, and connects various circuits including one or more processors represented by the processor 1000 and a memory represented by the memory 1020. The bus architecture may also connect various other circuits such as peripherals, voltage regulators and power management circuits, which is well known in the art. Therefore, a detailed description thereof is omitted herein. A bus interface provides an interface. The transceiver 1010 may be multiple elements, i.e., a transmitter and a receiver, to allow for communication with various other apparatuses on the transmission media. These transmission media include wireless channel, wired channel, optic fiber or the like. For different user equipment, the user interface 1030 may be an interface capable of externally or internally connecting a required device, and the connected device includes, but not limited to, a keypad, a display, a speaker, a microphone, a joystick and the like.

The processor 1000 is responsible for supervising the bus architecture and normal operations, and the memory 1020 may store the data being used by the processor 1000 during operations.

In an embodiment according to the present disclosure, the processor 1000 may be a CPU, an ASIC, an FPGA, or a CPLD. The processor may also adopt the multi-core architecture.

Figure 11:
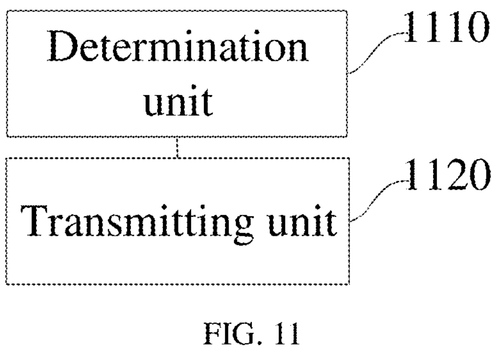
FIG. 11 shows a schematic structural diagram of a data transmission apparatus according to an embodiment of the present disclosure.

An embodiment of the present disclosure further provides a data transmission apparatus, which is applied in a base station. As illustrated in FIG. 11, the apparatus includes: a determination unit 1110 configured to determine that a terminal needs to receive a multicast broadcast service (MBS) service; and a transmitting unit 1120 configured to transmit numbering information of a PDCP data PDU of the MBS service to the terminal.

In the data transmission apparatus of the embodiment according to the present disclosure, that "the transmitting unit 1120 transmits the numbering information of the PDCP data PDU of the MBS service to the terminal" includes: transmitting the numbering information of the PDCP data PDU of the MBS service to the terminal through a message header of the PDCP data PDU.

In the data transmission apparatus of the embodiment according to the present disclosure, the message header of the PDCP data PDU further includes a predetermined indication bit for indicating whether the message header includes data packet numbering information.

In the data transmission apparatus of the embodiment according to the present disclosure, that "the transmitting unit 1120 transmits the numbering information of the PDCP data PDU of the MBS service to the terminal" includes: transmitting the numbering information of the PDCP data PDU of the MBS service to the terminal through a PDCP control PDU.

In the data transmission apparatus of the embodiment according to the present disclosure, the PDCP control PDU includes PDU type information; and the PDU type information indicates that the PDCP control PDU is used for transmitting the numbering information of the PDCP data PDU.

In the data transmission apparatus of the embodiment according to the present disclosure, that "the transmitting unit 1120 transmits the numbering information of the PDCP data PDU of the MBS service to the terminal" includes: transmitting, by the base station, a radio resource control (RRC) message. The RRC message carries the numbering information of the PDCP data PDU of the MBS service.

In the data transmission apparatus of the embodiment according to the present disclosure, that "the transmitting unit 1120 transmits the numbering information of the PDCP data PDU of the MBS service to the terminal" includes: transmitting the numbering information of the PDCP data PDU of the MBS service to the terminal through a dedicated resource or a shared resource.

In the data transmission apparatus of the embodiment according to the present disclosure, that "the transmitting unit 1120 transmits the numbering information of the PDCP data PDU of the MBS service to the terminal" includes: determining, by the base station, whether a predetermined trigger condition is satisfied; and transmitting the numbering information of the PDCP data PDU of the MBS service to the terminal in case that the predetermined trigger condition is satisfied.

In the data transmission apparatus of the embodiment according to the present disclosure, the predetermined trigger condition includes at least one of: a predetermined trigger period; resetting of PDCP sequence number occurring in two adjacent PDCP data PDU transmissions; or subsequent to transmitting the PDCP data PDU of the MBS service for the first time, monitoring that the terminal is a terminal that receives the PDCP data PDU for the first time.

In the data transmission apparatus of the embodiment according to the present disclosure, the numbering information includes a numbering COUNT value of the PDCP data PDU, a hyper frame number (HFN) of the PDCP data PDU, or both the numbering COUNT value of the PDCP data PDU and the HFN of the PDCP data PDU.

Figure 12:
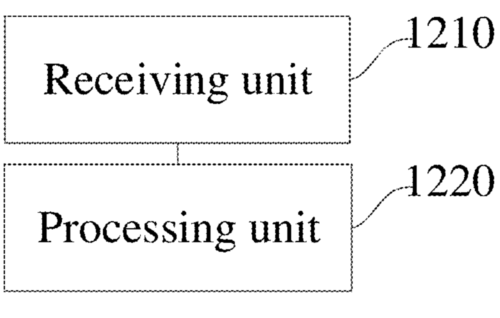
FIG. 12 shows a schematic structural diagram of a data transmission apparatus according to another embodiment of the present disclosure.

Another embodiment of the present disclosure further provides a data transmission apparatus, which is applied in a terminal. As illustrated in FIG. 12, the apparatus includes: a receiving unit 1210 configured to receive a PDCP data PDU of a multicast broadcast service (MBS) service and numbering information of the PDCP data PDU that are transmitted by a base station; and a processing unit 1220 configured to check and decrypt the received PDCP data PDU based on the numbering information, or transmit a PDCP status report to the base station, wherein the PDCP status report includes the numbering information.

In the data transmission apparatus of the embodiment according to the present disclosure, that "the receiving unit 1210 receives the numbering information of the PDCP data PDU transmitted by the base station" includes: receiving the numbering information of the PDCP data PDU transmitted by the base station through a message header of the PDCP data PDU.

In the data transmission apparatus of the embodiment according to the present disclosure, the message header of the PDCP data PDU further includes a predetermined indication bit for indicating whether the message header includes data packet numbering information.

In the data transmission apparatus of the embodiment according to the present disclosure, that "the receiving unit 1210 receives the numbering information of the PDCP data PDU transmitted by the base station includes: receiving the numbering information of the PDCP data PDU transmitted by the base station through a PDCP control PDU.

In the data transmission apparatus of the embodiment according to the present disclosure, the PDCP control PDU includes PDU type information; and the PDU type information indicates that the PDCP control PDU is used for transmitting the numbering information of the PDCP data PDU.

In the data transmission apparatus of the embodiment according to the present disclosure, that "the receiving unit 1210 receives the numbering information of the PDCP data PDU transmitted by the base station" includes: receiving a radio resource control (RRC) message transmitted by the base station. The RRC message carries the numbering information of the PDCP data PDU of the MBS service.

In the data transmission apparatus of the embodiment according to the present disclosure, that "the receiving unit 1210 receives the numbering information of the PDCP data PDU transmitted by the base station" includes: receiving, by the terminal, the numbering information of the PDCP data PDU transmitted by the base station through a dedicated resource or a shared resource.

It should be noted that the above-mentioned data transmission apparatus provided in the embodiments of the present disclosure can implement all method steps implemented by the foregoing method embodiments, and can achieve the same technical effect. The same parts and beneficial effects in this embodiment as that of the method embodiments will be omitted herein.

The method and apparatus are based on the same application concept. The implementations of the apparatus and method may refer to each other due to the method and apparatus have a same principle of solving the problem, and details are omitted herein.

An embodiment of the present disclosure further provides a processor-readable storage medium storing thereon a computer program. The computer program is configured to cause a processor to perform steps of the data transmission method performed by a base station or a terminal. The processor readable storage medium may be any available medium or data storage device that can be accessed by the processor, including but not limited to magnetic storage (such as floppy disk, hard disk, magnetic tape, magneto-optical disk (MO)), optical storage (such as compact disc (CD), digital versatile disc (DVD), blue-ray disc (BD), high-definition versatile disc (HVD)), and semiconductor memory (such as read-only memory (ROM), erasable programmable ROM (EPROM), electrically erasable programmable ROM (EEPROM), non-volatile memory (NAND FLASH), solid-state drive or solid state disk (SSD)), etc.

Those skilled in the art should appreciate that the embodiments of the present disclosure may be provided as a method, a system, or a computer program product. Therefore, the present disclosure may take the form of complete hardware embodiments, complete software embodiments, or embodiments combining software and hardware. Moreover, the present disclosure may take the form of a computer program product implemented on one or more computer usable storage media (including but not limited to magnetic disk storage, optical storage, etc.) including a computer usable program code.

The present disclosure is described with reference to the flow chart and/or the block diagram of the method, device (system), and computer program product according to the embodiments of the present disclosure. It should be appreciated that each of processes and/or blocks in a flow chart and/or block diagram, and a combination of the processes and/or blocks in the flow chart and/or block diagram may be implemented by computer executable instructions. These computer executable instructions may be provided to a processor of a general-purpose computer, a specialized computer, an embedded processing device, or other programmable data processing devices to generate a machine, such that the instructions, which are executed via the processor of the computer or other programmable data processing terminal device, create means for implementing the functions specified in the flow diagram flow or flows and/or block diagram block or blocks.

These processor executable instructions may also be stored in processor-readable memory that may guide computers or other programmable data processing devices to work in a specific way, causing the instructions stored in the processor readable memory to generate a manufacturing product including instruction devices that implement the functions specified in the flow diagram flow or flows and/or block diagram block or blocks.

These processor executable instructions may also be loaded onto a computer or other programmable data processing device, enabling a series of operational steps to be performed on the computer or other programmable device to generate computer-implemented processing, such that the instructions which are executed on the computer or other programmable terminal device provide steps for implementing the functions specified in the flow diagram flow or flows and/or block diagram block or blocks.

It should be noted and understood that the division of the above modules is only a division of logical functions, which may be fully or partially integrated into a physical entity or physically separated in actual implementations. These modules may all be implemented in the form of software called by processing elements; or may all be implemented in the form of hardware; or, some modules may be implemented in the form of software called by processing elements, and some modules may be implemented in the form of hardware. For example, the determination module may be a separate processing element, or may be integrated into a certain chip of the above device, or, may be stored in the memory of the above device in the form of program code which is called and executed by a certain processing element of the above device to perform the functions of the determination module. Other modules have similar implementations. In addition, all or part of these modules may be integrated together, or may be implemented independently. The processing element mentioned here may be an integrated circuit with signal processing capability. In the implementation process, the various steps of the above method or the above various modules may be implemented by an integrated logic circuit in hardware form in a processor element or instructions in the form of software.

For example, the various modules, units, subunits or submodules may be one or more integrated circuits configured to implement the above methods, such as one or more application specific integrated circuits (ASIC), or one or more microprocessors (digital signal processor, DSP), or one or more field programmable gate arrays (FPGA). As another example, when a module described above is implemented in the form of program codes called by a processing element, the processing element may be a general purpose processor, such as a central processing unit (CPU) or other processors that may call program codes. As another example, these modules may be integrated together and implemented as a system-on-a-chip (SOC).

Terms such as "first" and "second" in the specification and the claims of the present disclosure are used for distinguishing similar objects and are not necessarily used for describing a specific order or sequence. It should be understood that the terms used in this way may be interchanged under appropriate circumstances, so that the embodiments of the present application described herein may be implemented in a sequence other than those illustrated or described herein. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent in the process, method, product, or device. Moreover, the term "and/or" used in the specification and the claims indicates at least one of connected objects, for example, A and/or B and/or C means 7 situations including: A alone, B alone, C alone, both A and B, both B and C, both A and C, and all of A, B and C. Similarly, the use of "at least one of A or B" in this specification and claims should be understood as "A alone, B alone, or both A and B".

Obviously, a person skilled in the art may make various modifications and variations to the present disclosure without departing from the spirits and scope of the present disclosure. Thus, if these modifications and variations of the present disclosure fall within the scope of the claims of the present disclosure and the equivalent technologies thereof, the present disclosure is also intended to cover all these variations or modifications.

What is claimed is:

1. A data transmission method, performed by a base station, comprising:

determining, by the base station, a first multicast broadcast service (MBS) service; and transmitting numbering information of a packet data convergence protocol (PDCP) data protocol data unit (PDU) of the first MBS service to a terminal;

wherein the transmitting the numbering information of the PDCP data PDU of the first MBS service to the terminal comprises:

transmitting the numbering information of the PDCP data PDU of the first MBS service to the terminal through a packet data convergence protocol (PDCP) control protocol data unit (PDU);

wherein the PDCP control PDU comprises PDU type information; and the PDU type information indicates that the PDCP control PDU is used for transmitting the numbering information of the PDCP data PDU.

2. The data transmission method according to claim 1, wherein the transmitting the numbering information of the PDCP data PDU of the first MBS service to the terminal further comprises:

transmitting the numbering information of the PDCP data PDU of the first MBS service to the terminal through a message header of the PDCP data PDU;

or, transmitting, by the base station, a radio resource control (RRC) message, the RRC message carrying the numbering information of the PDCP data PDU of the first MBS service;

or, transmitting the numbering information of the PDCP data PDU of the first MBS service to the terminal through a dedicated resource or a shared resource.

3. The data transmission method according to claim 2, wherein the message header of the PDCP data PDU further comprises a predetermined indication bit for indicating whether the message header comprises data packet numbering information.

4. The data transmission method according to claim 1, wherein the transmitting the numbering information of the PDCP data PDU of the first MBS service to the terminal comprises:

determining, by the base station, whether a predetermined trigger condition is satisfied; and transmitting the numbering information of the PDCP data PDU of the first MBS service to the terminal in case that the predetermined trigger condition is satisfied.

5. The data transmission method according to claim 4, wherein the predetermined trigger condition comprises at least one of:

a predetermined trigger period;

resetting of PDCP sequence number occurring in two adjacent PDCP data PDU transmissions; or subsequent to transmitting the PDCP data PDU of the first MBS service for the first time, monitoring that the terminal is a terminal that receives the PDCP data PDU for the first time.

6. The data transmission method according to claim 1, wherein the numbering information comprises: a numbering COUNT value of the PDCP data PDU, a hyper frame number (HFN) of the PDCP data PDU, or both the numbering COUNT value of the PDCP data PDU and the HFN of the PDCP data PDU.

7. A base station, comprising:

a memory for storing a computer program;

a processor; and a transceiver for transmitting and receiving data under control of the processor, wherein the processor is configured to read the computer program in the memory to perform the steps of the data transmission method according to claim 1.

8. The base station according to claim 7, wherein the transmitting the numbering information of the PDCP data PDU of the first MBS service to the terminal further comprises:

transmitting the numbering information of the PDCP data PDU of the first MBS service to the terminal through a message header of the PDCP data PDU;

and/or, wherein the transmitting the numbering information of the PDCP data PDU of the first MBS service to the terminal comprises:

determining whether a predetermined trigger condition is satisfied; and transmitting the numbering information of the PDCP data PDU of the first MBS service to the terminal in case that the predetermined trigger condition is satisfied.

9. The base station according to claim 8, wherein the message header of the PDCP data PDU further comprises a predetermined indication bit for indicating whether the message header comprises data packet numbering information.

10. The base station according to claim 8, wherein the predetermined trigger condition comprises at least one of:

a predetermined trigger period;

resetting of PDCP sequence number occurring in two adjacent PDCP data PDU transmissions; or subsequent to transmitting the PDCP data PDU of the first MBS service for the first time, monitoring that the terminal is a terminal that receives the PDCP data PDU for the first time.

11. A non-transitory processor-readable storage medium storing thereon a computer program, wherein the computer program is configured to cause a processor to perform the data transmission method according to claim 1.

12. A data transmission method, performed by a terminal, comprising:

receiving, by the terminal, a packet data convergence protocol (PDCP) data protocol data unit (PDU) of a first multicast broadcast service (MBS) service and numbering information of the PDCP data PDU that are transmitted by a base station; and checking and decrypting the received PDCP data PDU based on the numbering information, or transmitting a PDCP status report to the base station, the PDCP status report comprising the numbering information;

wherein the receiving, by the terminal, the numbering information of the PDCP data PDU transmitted by the base station comprises:

receiving the numbering information of the PDCP data PDU transmitted by the base station through a PDCP control PDU;

wherein the PDCP control PDU comprises PDU type information; and the PDU type information indicates that the PDCP control PDU is used for transmitting the numbering information of the PDCP data PDU.

13. The data transmission method according to claim 12, wherein the receiving, by the terminal, the numbering information of the PDCP data PDU transmitted by the base station further comprises:

receiving the numbering information of the PDCP data PDU transmitted by the base station through a message header of the PDCP data PDU;

or, receiving an RRC message transmitted by the base station, the RRC message carrying the numbering information of the PDCP data PDU of the first MBS service.

14. The data transmission method according to claim 13, wherein the message header of the PDCP data PDU further comprises a predetermined indication bit for indicating whether the message header comprises data packet numbering information.

15. A non-transitory processor-readable storage medium storing thereon a computer program, wherein the computer program is configured to cause a processor to perform the data transmission method according to claim 12.

16. A terminal, comprising:

a memory for storing a computer program;

a processor; and a transceiver for transmitting and receiving data under control of the processor, wherein the processor is configured to read the computer program in the memory to perform:

receiving a packet data convergence protocol (PDCP) data protocol data unit (PDU) of a first multicast broadcast service (MBS) service and numbering information of the PDCP data PDU that are transmitted by a base station; and checking and decrypting the received PDCP data PDU based on the numbering information, or transmitting a PDCP status report to the base station, the PDCP status report comprising the numbering information;

wherein the receiving the numbering information of the PDCP data PDU transmitted by the base station comprises:

receiving the numbering information of the PDCP data PDU transmitted by the base station through a PDCP control PDU;

wherein the PDCP control PDU comprises PDU type information; and the PDU type information indicates that the PDCP control PDU is used for transmitting the numbering information of the PDCP data PDU.

17. The terminal according to claim 16, wherein the receiving the numbering information of the PDCP data PDU transmitted by the base station further comprises:

receiving the numbering information of the PDCP data PDU transmitted by the base station through a message header of the PDCP data PDU;

or receiving an RRC message transmitted by the base station, the RRC message carrying the numbering information of the PDCP data PDU of the first MBS service.

18. The terminal according to claim 17, wherein the message header of the PDCP data PDU further comprises a predetermined indication bit for indicating whether the message header comprises data packet numbering information.

* * * * *